No. 862,744. PATENTED AUG. 6, 1907.
S. T. MARLETTE.
HAME FASTENER.
APPLICATION FILED JUNE 7, 1906.

WITNESSES
Samuel E. Wade
Amos W. Hart

INVENTOR
Silas T. Marlette.
BY Munn & Co.
ATTORNEYS

UNITED STATES PATENT OFFICE.

SILAS T. MARLETTE, OF BUFFALO, NEW YORK, ASSIGNOR TO ELLEN MARLETTE AND EBEN B. SMITH, OF BUFFALO, NEW YORK.

HAME-FASTENER.

No. 862,744.　　　　　Specification of Letters Patent.　　　　　Patented Aug. 6, 1907.

Application filed June 7, 1906. Serial No. 320,621.

*To all whom it may concern:*

Be it known that I, SILAS T. MARLETTE, a citizen of the United States, and a resident of Buffalo, in the county of Erie and State of New York, have invented an Improved Hame-Fastener, of which the following is a specification.

The object of my invention is to provide an improved fastening for hames, the same being adapted to be easily applied and removed and to be extended or retracted to adapt it for collars of different sizes.

The details of construction are as hereinafter described and illustrated in accompanying drawing, in which—

Figure 1:
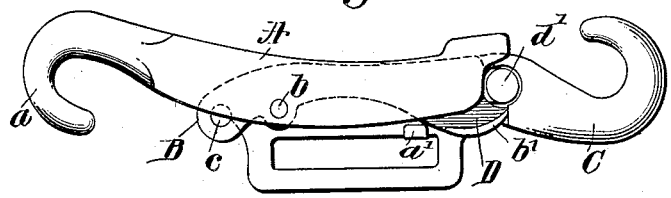
Figure 2:
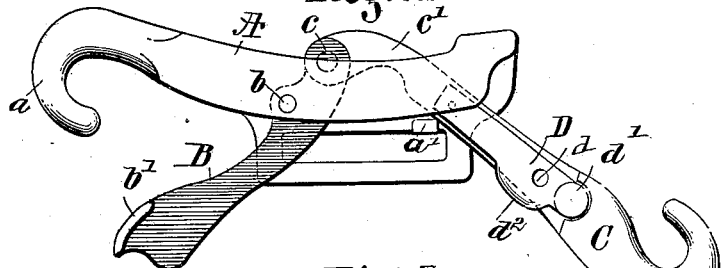
Figure 3:
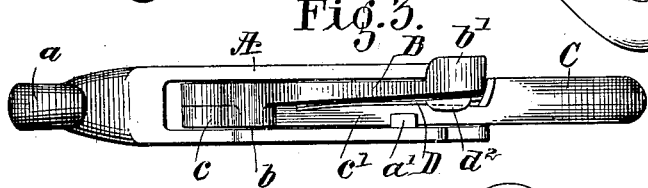
Figure 4:
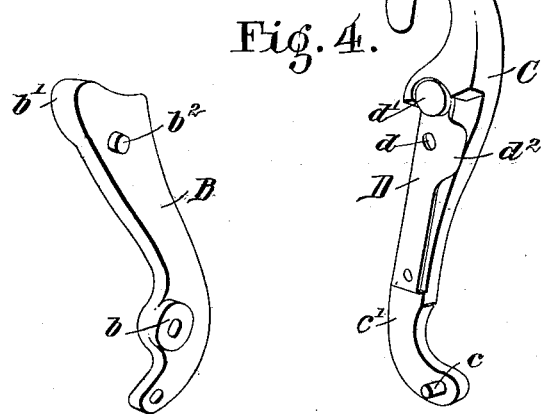

Figure 1 is a side view of my improved hame fastening in the closed or locked position. Fig. 2 is a view of the same in the unlocked position. Fig. 3 is a bottom plan view of the fastening. Fig. 4 includes perspective views of two movable parts of the fastening.

A indicates the body or main frame of the fastening, the same being provided with a lengthwise slot as shown in Fig 3 and with a hook $a$ which is turned downward. A lever B is pivoted at $b$ to the frame A and to its shorter arm is in turn pivoted, at $c$, the elongated shank $c'$ of a hook C. In Fig. 1, the lever B is shown closed into the slot of the body portion A and the hook C is therefore in the position it would have when duly engaged with a hame.

As will be observed in Fig. 1, the arrangement of the pivots $b$, $c$, is such that when the parts B, C, are closed the said pivots are not in line with each other and the hook C, the pivot $c$ being at a lower point than the pivot $b$. As shown in Fig. 2, the shank $c'$ of the hook C is curved, or cut out on the under side, in such manner as to accommodate the pivot $b$ of the lever B. Thus, when the parts B, C, are closed as in Fig. 1, the hook C is locked. In other words, traction on the hook C will not open the lever B as shown in Fig. 2, since the traction is not in line with the pivots and the hook. The lever B is provided with a flange or thumb catch $b'$—see Figs. 2 and 3—for convenience in opening it when it is required to release the hook C from the adjacent hame. As shown in Fig. 2, when the lever B is swung downward and backward, the hook C is forced outward and downward, and in such case it slides on a lug $a'$ which is cast in one piece with the body A.

While the arrangement of the pivotal points as above described may be ordinarily relied upon for holding the hook C locked securely, as an additional means I employ a spring catch, the same being formed by means of a plate spring D, see Fig. 4, which is secured at one end to the shank $c'$ of the hook C, and I further provide the lever B with a lug or stud $b^2$, which is adapted to enter a hole $d$ in the spring D. The head $d'$ of the spring is enlarged or thickened and lies in a recess provided in the body of the hook C. When the lever B is closed, as in Figs. 1 and 3, the lug or stud $b^2$ enters the hole $d$ of spring D and is thus locked with it; but when it is desired to release the lever B, pressure is applied to the head $d'$ of the spring and it is thereby forced laterally into the cavity provided in the hook C, so as to free the spring from the stud $b^2$, so that the lever may be swung open as indicated in Fig. 2. To provide for easy engagement of the stud $b^2$ with the spring B, the latter is provided with an outturned flange $d^2$, as shown in Figs. 3 and 4, and in closing the lever B the stud strikes upon and rides up on the said flange until it enters the hole $d$ in the spring.

What I claim is—

The improved hame-fastener comprising a slotted body having a hame hook at one end, a slidable hame hook projecting from the other end of said body, and having a downwardly curved shank, a lever provided near its free end with a lateral stud, and a plate spring secured at one end to the shank of the slidable hook and provided with a hole to receive said stud, its free end projecting beyond the lever in position for manual access, so that it may be pressed laterally for unlocking the lever, as described.

SILAS T. MARLETTE.

Witnesses:
CHAS. F. HOUCK,
M. E. PERGANDE.